(12) United States Patent
Ito et al.

(10) Patent No.: US 6,534,930 B2
(45) Date of Patent: Mar. 18, 2003

(54) DISCHARGE LAMP LIGHTING CIRCUIT WITH PROTECTION CIRCUIT

(75) Inventors: Masayasu Ito, Shizuoka (JP); Hitoshi Takeda, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 09/901,928

(22) Filed: Jul. 10, 2001

(65) Prior Publication Data

US 2002/0047634 A1 Apr. 25, 2002

(30) Foreign Application Priority Data

Jul. 12, 2000 (JP) .......................................... 2000-211096

(51) Int. Cl.[7] .............................................. H05B 37/04
(52) U.S. Cl. ........................... 315/291; 315/82; 315/88; 315/90
(58) Field of Search ................................. 315/307, 308, 315/291, 88, 90, 82, 83, 119, 120, 127, 360, 224, 225, DIG. 7, 91; 361/75, 78, 79, 88, 86, 90, 91.1, 91.2, 91.3; 307/10.8

(56) References Cited

U.S. PATENT DOCUMENTS

| | | | | | |
|---|---|---|---|---|---|
| 3,558,972 | A | * | 1/1971 | Arai | 315/77 |
| 3,631,441 | A | * | 12/1971 | Murphy | 315/136 |
| 4,728,861 | A | * | 3/1988 | Kurihara et al. | 315/133 |
| 5,142,203 | A | | 8/1992 | Oda et al. | 315/308 |
| 5,194,779 | A | * | 3/1993 | Segoshi et al. | 307/10.8 |
| 5,216,328 | A | * | 6/1993 | Lu | 307/10.8 |
| 5,295,036 | A | | 3/1994 | Yagi et al. | 361/79 |
| 5,828,177 | A | * | 10/1998 | Toda et al. | 307/10.8 |
| 5,973,457 | A | * | 10/1999 | Yamashita et al. | 313/318.01 |
| 6,396,216 | B1 | * | 5/2002 | Noone et al. | 315/119 |

* cited by examiner

Primary Examiner—David Vu
Assistant Examiner—Ephrem Alemu
(74) Attorney, Agent, or Firm—Fish & Richardson P.C.

(57) ABSTRACT

A discharge lamp lighting circuit 1 has a DC power supply section 4 for receiving power supply from a DC power supply 2, a DC-AC conversion section 5 for converting an output voltage of the DC power supply section 4 into an AC voltage and then applying the AC voltage to a discharge lamp 8, and a starter circuit 6 for applying a high-voltage pulse to the discharge lamp 8 for starting the lamp. A control circuit 7 detects an anomaly occurring in the discharge lamp or the lighting circuit and stops supplying power to the discharge lamp 8 and also lights another light source as an alternative light source to the discharge lamp 8 or notifies a driver of occurrence of the anomaly. An internal state monitoring circuit 26 is provided for monitoring the operation state of the control circuit itself and when an anomaly about the control circuit 7 is detected, the alternative light source is lighted or the driver is notified of occurrence of the anomaly.

7 Claims, 12 Drawing Sheets

DISCHARGE LAMP LIGHTING CIRCUIT
WITH PROTECTION CIRCUIT

BACKGROUND OF THE INVENTION

This invention relates to an art for taking a reliable safety measure when an anomaly occurs in a discharge lamp lighting circuit.

The configuration of a lighting circuit of a discharge lamp, such as a metal halide lamp, comprising a DC power supply circuit, a DC-AC conversion circuit, and a starter circuit is known. For example, when an anomaly occurs in the discharge lamp or the lighting circuit, an anomaly detection circuit or a control circuit detects the anomaly and stops the operation of the lighting circuit, so that a high voltage can be prevented from injuring a human body or the detrimental effects of smoking, firing, etc., caused by excessive electric power output can be prevented.

However, if the discharge lamp is simply turned off, the safety measure is insufficient in application to vehicle lamps, etc., because there is a problem of requiring the driver to run the vehicle in the dark, etc. Measures of lighting an alternative light source, notifying the driver that an anomaly occurs, etc., are taken.

However, in the above-described measures, if an anomaly occurs in the circuit itself provided for detecting an anomaly, lighting the alternative light source, or notifying the driver that an anomaly occurs, there are possibilities that the intended safety measure may not be taken.

For example, when the control circuit for controlling lighting of the discharge lamp and detecting an anomaly occurring fails, etc., it becomes impossible not only to light the discharge lamp, but also to light the alternative light source, etc.

SUMMARY OF THE INVENTION

It is therefore an object of the invention to take a sufficient safety measure before an anomaly occurs in control of a discharge lamp or a lighting circuit and causes a serious condition.

According to the invention, there is provided a discharge lamp lighting circuit comprising a control circuit for detecting an anomaly occurring in a discharge lamp or the lighting circuit, stopping power supply to the discharge lamp or stopping operation of the lighting circuit, and lighting another light source as an alternative light source to the discharge lamp or notifying a driver of occurrence of the anomaly, wherein an internal state monitoring circuit for monitoring the operation state of the control circuit itself is provided and wherein when the internal state monitoring circuit detects an anomaly in the control circuit or detects a sign of occurrence of an anomaly, the alternative light source is lighted or the driver is notified of anomaly occurrence.

Thus, according to the invention, the internal state monitoring circuit monitors the operation state of the control circuit, whereby the alternative light source is lighted or the driver is notified of anomaly occurrence before the control circuit shows abnormal operation.

DETAILED DESCRIPTION OF THE PREFERRED EMBODIMENTS

Figure 1:
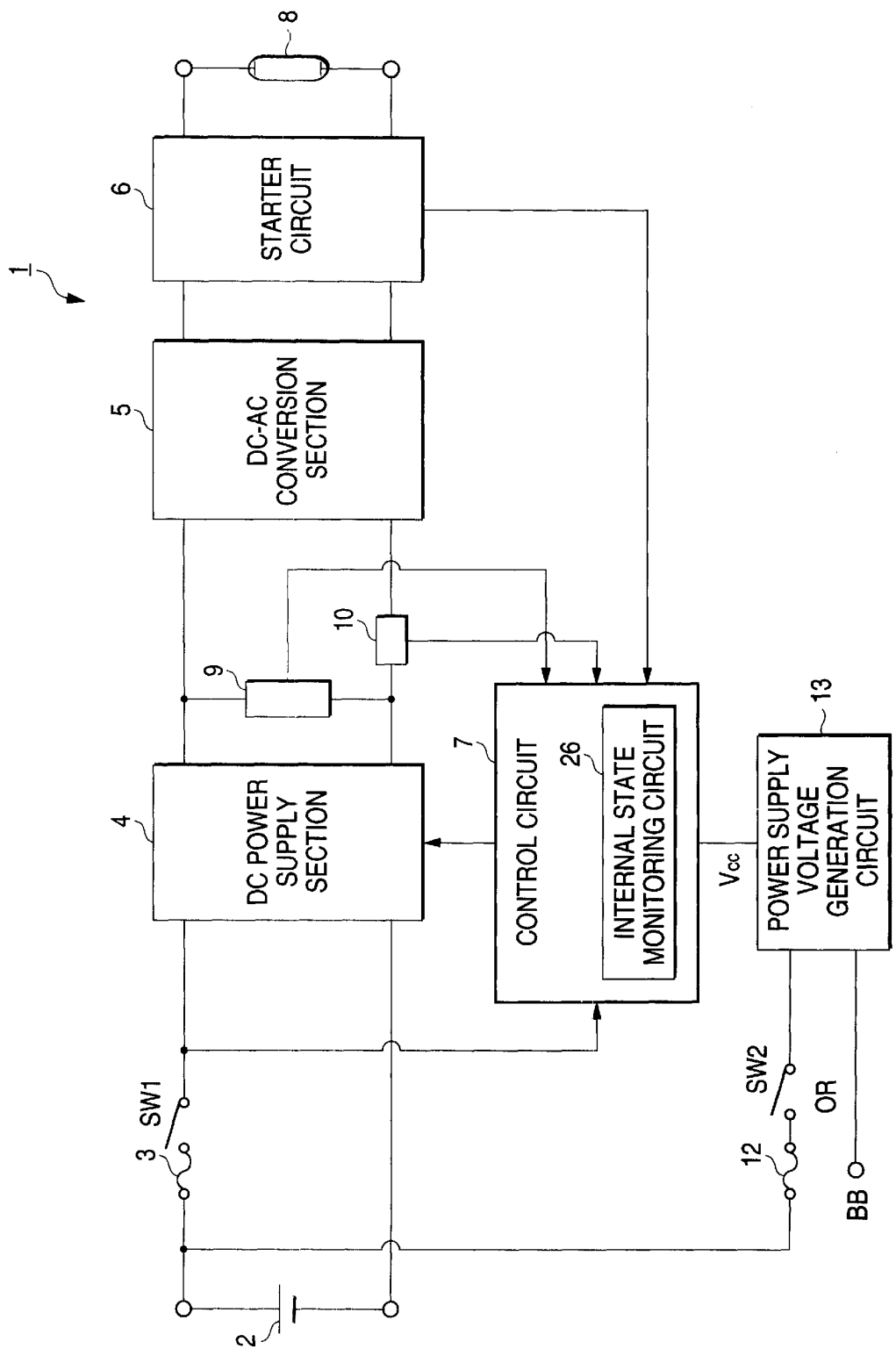
FIG. 1 is a circuit block diagram to show the basic configuration of a discharge lamp lighting circuit according to the invention.

FIG. 1 shows the basic configuration of a discharge lamp lighting circuit 1 according to the invention, and the discharge lamp lighting circuit 1 comprises the following components (the numeral enclosed in parentheses indicates the reference numeral):

DC power supply (2);
overcurrent protection means (3);
DC power supply section (4);
DC-AC conversion section (5);
starter circuit (6); and
control circuit (7).

In the lighting circuit, the DC power supply section 4 receives power supply from the DC power supply 2 via the overcurrent protection means 3 and switch means SW1. That is, when the switch means SW1 is turned on, supply voltage from the DC power supply 2 via the overcurrent protection means 3 (for example, an overcurrent protection element such as a fuse or a circuit breaker) is supplied to the DC power supply section 4 as input voltage, and the DC power supply section 4 converts the input voltage into any desired DC voltage in response to a signal from the control circuit 7 and outputs the DC voltage. For example, a DC-DC converter having the configuration of a switching regulator (flyback type, chopper type, etc.,) is used.

The DC-AC conversion section 5 is provided for converting the output voltage of the DC power supply section 4 into AC voltage and then applying the AC voltage to a discharge lamp 8. For example, a bride-type circuit using a plurality of pairs of semiconductor switch elements, a DC-AC converter using a converter transformer, etc., or the like can be named; as far as the invention is concerned, however, any configuration may be adopted and the waveform of the AC voltage supplied to the discharge lamp 8 may be any, such as a sine wave or a rectangular wave.

The starter circuit 6 is provided for applying a high-voltage pulse to the discharge lamp 8 for starting the lamp. The pulse is generated at a predetermined timing from the point in time at which power is input to the discharge lamp 8, and is superposed on the output voltage of the DC-AC conversion section 5 and is applied to the discharge lamp 8.

The control circuit 7 (in the configuration in FIG. 1, power is supplied to the control circuit 7 via switch means SW2 or any other power supply voltage is used) comprises the following functions of:

(A) Detecting an anomaly occurring in the discharge lamp or the lighting circuit and stopping power supply to the discharge lamp or the operation of the lighting circuit; and (B) If it is made impossible to light the discharge lamp, lighting another light source as an alternative light source to the discharge lamp or notifying the driver of occurrence of anomaly.

That is, the function (A) is required to ensure that power is normally supplied to the discharge lamp 8. For example, if a PWM (pulse width modulation) system is adopted for controlling the DC-DC converter forming the DC power supply section 4, a control signal with a duty cycle changing in response to a detection signal of voltage or current of the discharge lamp 8 is generated and is supplied to the switching element in the DC-DC converter, whereby output is controlled; if an anomaly of the output current, etc., is detected, power supply to the discharge lamp 8 can be stopped or the circuit operation can be stopped for avoiding any possible crisis.

As an anomaly of the light state of the discharge lamp 8, for example, abnormal lessening of the electric current flowing into the discharge lamp 8, an overcurrent of the DC power supply section 4, operation stop of the DC-AC conversion section 5, or the like is detected.

The voltage and current of the discharge lamp 8 can be detected by placing a voltage detection section (partial potential resistor, etc.,) 9 and a current detection section (shunt resistor, etc., for voltage conversion) 10 at the output stage of the DC power supply section 4.

In addition, a function of detecting an anomaly of input voltage to the DC power supply section 4, for example, determining that the magnitude of the input voltage becomes lower than or greater than the tolerance is named. This function is required for protecting the discharge lamp and the lighting circuit from the detrimental effects caused by fluctuation in the power supply voltage.

By the way, when the current flowing into the lighting circuit becomes excessive and the overcurrent protection means 3 works, power is not supplied to the DC power supply section 4 and therefore its following circuits or the discharge lamp 8. For example, to use a fuse as the overcurrent protection means 3, if DC input increases and the fuse blows (for example, the DC-DC converter fails, etc.,), DC power supply is not input and therefore the lighting circuit does not operate.

However, considering the safety of vehicle running in application to vehicle lamps, leaving standing the above-described state, namely, the state in which the discharge lamp 8 cannot be lighted is not preferred and it is desired that the driver should be notified that some anomaly occurs in lighting the discharge lamp 8 or that an alternative light source (or an auxiliary light source) should be lighted.

To do this, even when the overcurrent protection means 3 works, power supply to the control circuit 7 needs to be provided, for example, in either of the following modes in which:

(I) A voltage acquired from a position on the DC power supply side rather than the overcurrent protection means 3 or a voltage generated from that voltage is supplied to the control circuit as power supply voltage; and (II) a voltage from a route separate from the DC power supply 2 or a voltage generated from that voltage is supplied to the control circuit as power supply voltage.

First, in the mode (I), the possible configuration is as follows: Supply voltage via the first overcurrent protection means 3 from the DC power supply 2 is supplied to the DC power supply section 4 forming a part of the lighting circuit and supply voltage via second overcurrent protection means from the DC power supply or voltage generated from that supply voltage is supplied to the control circuit 7 as power supply voltage.

Figure 2:
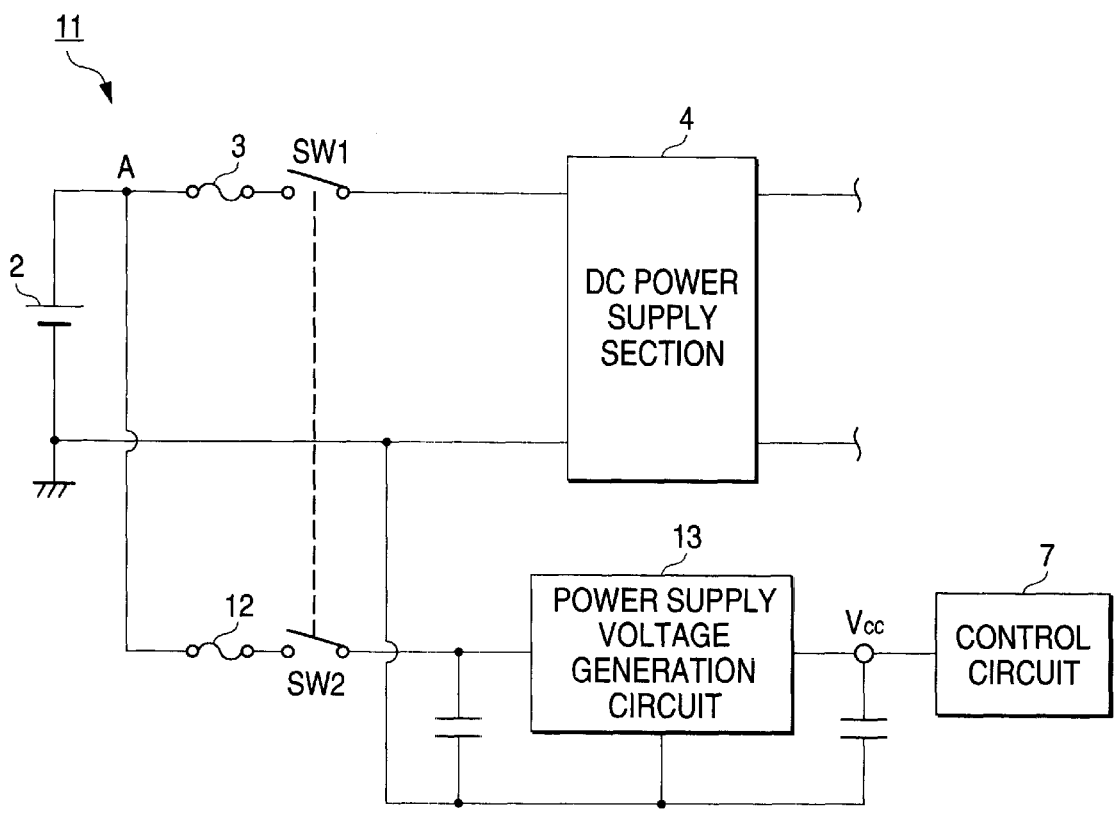
FIG. 2 is a circuit block diagram to show the main part of a configuration for supplying power supply voltage based on one of two branch voltages from a DC power supply to a control circuit.

FIG. 2 shows the main part of such a configuration example 11.

As shown in the figure, power supply voltage is supplied from the DC power supply 2 via the first overcurrent protection means 3 and the switch element SW1 to the DC power supply section 4 of the lighting circuit and branches off at a branch point "A" (connection point of the DC power supply 2 and the first overcurrent protection means 3) from the DC power supply 2 and then is supplied via second overcurrent protection means 12 and the switch element SW2 to a power supply voltage generation circuit 13.

The power supply voltage through the second overcurrent protection means 12 and the switch element SW2 may be supplied to the control circuit 7 as it is; in the example, however, voltage generated by the power supply voltage generation circuit 13 (VCC) is supplied to the control circuit 7. The first switch element SW1 placed on the power supply route from the DC power supply 2 to the DC power supply section 4 and the second switch element SW2 placed on the power supply route to the control circuit 7 are opened or closed in synchronization with each other; when the discharge lamp 8 is lighted, the switch elements are closed.

Figure 3:
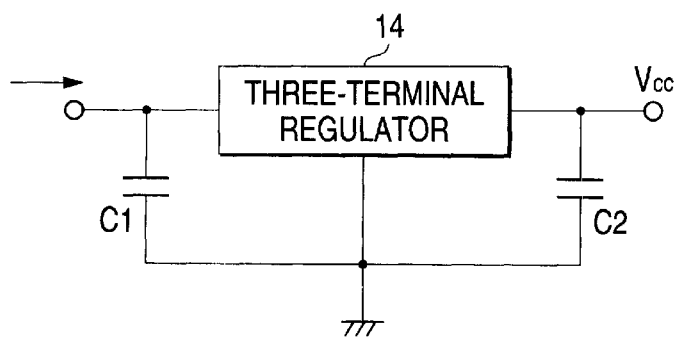
FIG. 3 shows a configuration example of a power supply voltage generation circuit and is a drawing to show an example of using a three-terminal regulator.
Figure 4:
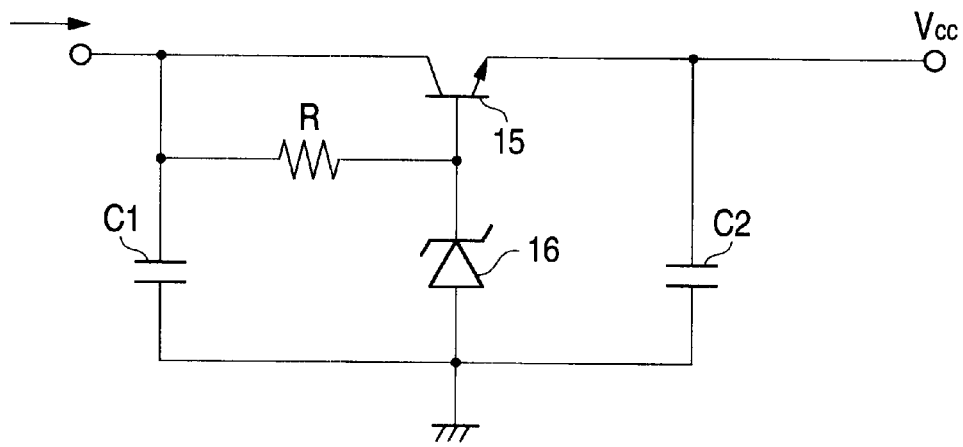
FIG. 4 shows a configuration example of the power supply voltage generation circuit and is a drawing to show an example of using a series regulator.
Figure 5:
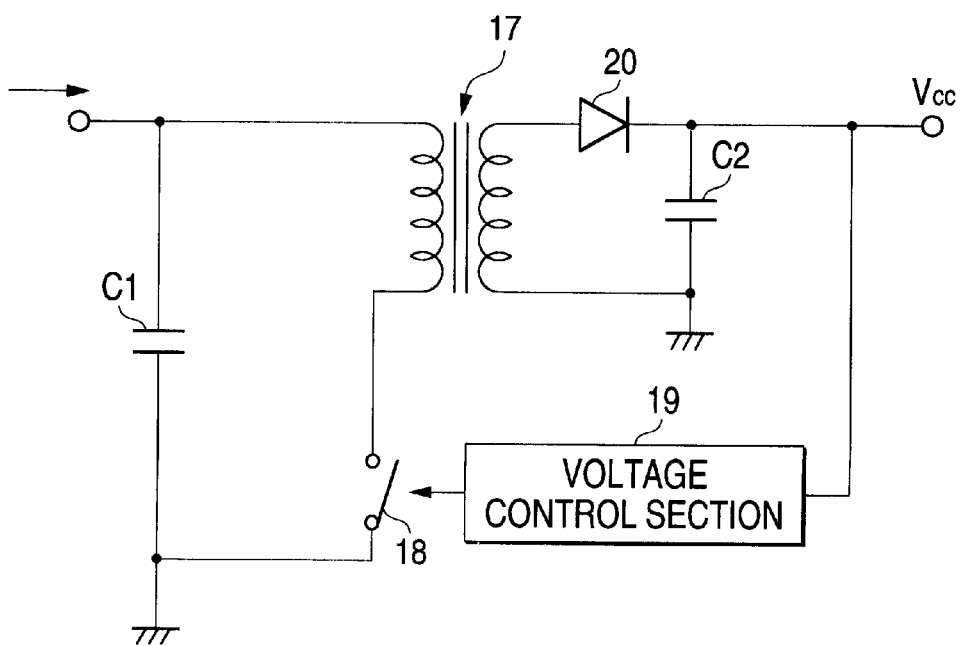
FIG. 5 shows a configuration example of the power supply voltage generation circuit and is a drawing to show an example of using a switching regulator.

The possible configuration of the power supply voltage generation circuit 13 is, for example, as follows (although any configuration and method to generate voltage may be adopted):

Configuration of three-terminal regulator (see FIG. 3);

configuration of series regulator (see FIG. 4); or configuration of switching regulator (see FIG. 5).

In FIG. 3, the power supply voltage generation circuit 13 is made up of a three-terminal regulator IC 14 and capacitors C1 and C2 added to input/output terminals of the three-terminal regulator. FIG. 4 shows an example of using a transistor 15, a Zener diode 16, capacitors C1 and C2, and a resistor R (bootstrap circuit). FIG. 5 shows a flyback-type circuit example made up of a transformer 17, a capacitor C1 and a switching element 18 (indicated simply by a switch symbol in the figure) placed on the primary side of the transformer 17, a voltage control section 19 for driving the switching element 18, thereby keeping output voltage constant, and a diode 20 and a capacitor C2 connected to the secondary winding of the transformer 17.

In the configuration shown in FIG. 2, if the first overcurrent protection means 3 blows and it is made impossible to supply power to the DC power supply section 4 of the lighting circuit, power is supplied to the control circuit 7 to ensure that the control circuit 7 operates unless the second overcurrent protection means 12 is broken.

In the mode (II), a voltage on a route separate from the DC power supply 2 to the lighting circuit or a voltage generated from that voltage is supplied to the control circuit 7, whereby power supply to the control circuit 7 is provided even when the overcurrent protection means 3 works.

Figure 6:
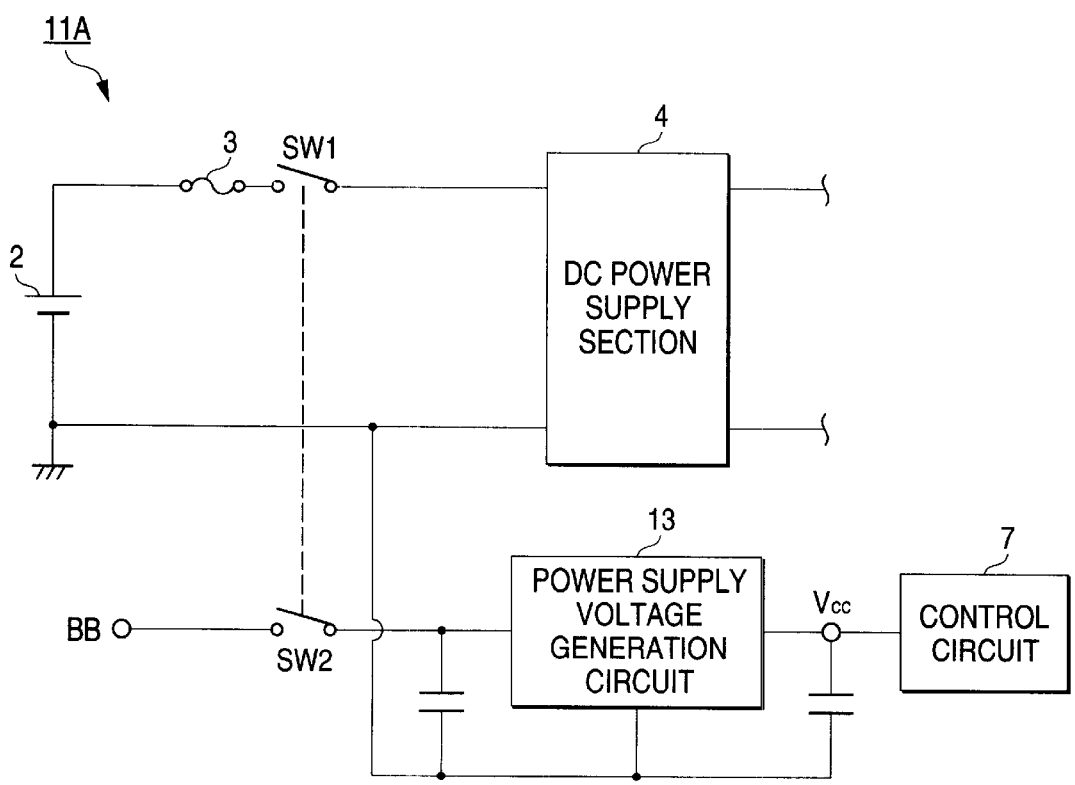
FIG. 6 is a circuit block diagram to show the main part of a configuration for supplying power supply voltage from a power supply on another route to the control circuit.

FIG. 6 shows the main part of such a configuration example 11A.

As shown in the figure, power supply voltage is supplied from the DC power supply 2 via the overcurrent protection means 3 and the switch element SW1 to the DC power supply section 4 of the lighting circuit, but the power supply route to the control circuit 7 is made separate from the power supply route to the lighting circuit.

That is, the power supply voltage on the separate route (for example, ignition voltage, etc., is used for an automobile; hereinafter the power supply voltage will be described as BB) is supplied through the switching element SW2 to the power supply voltage generation circuit 13.

The first switch element SW1 and the second switch element SW2 are opened or closed in synchronization with each other, as previously described.

Thus, in the circuit, if the overcurrent protection means 3 works and it is made impossible to supply power to the DC power supply section 4 of the lighting circuit, power is supplied to the control circuit 7 to ensure that the control circuit 7 operates as long as the power supply voltage BB is supplied thereto.

Figure 7:
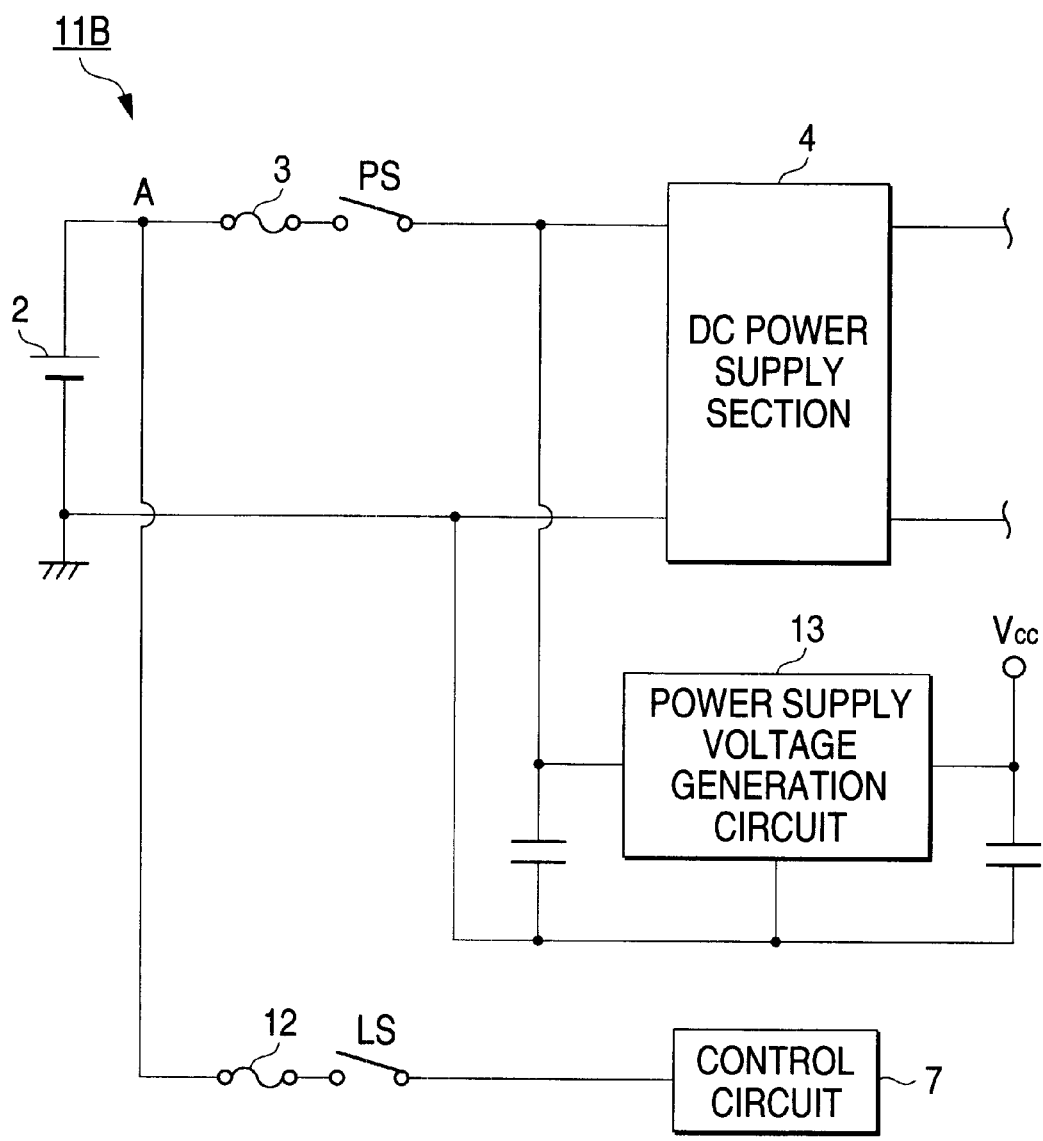
FIG. 7 is a circuit block diagram to show another configuration example for power supply to a lighting circuit and the control circuit.
Figure 8:
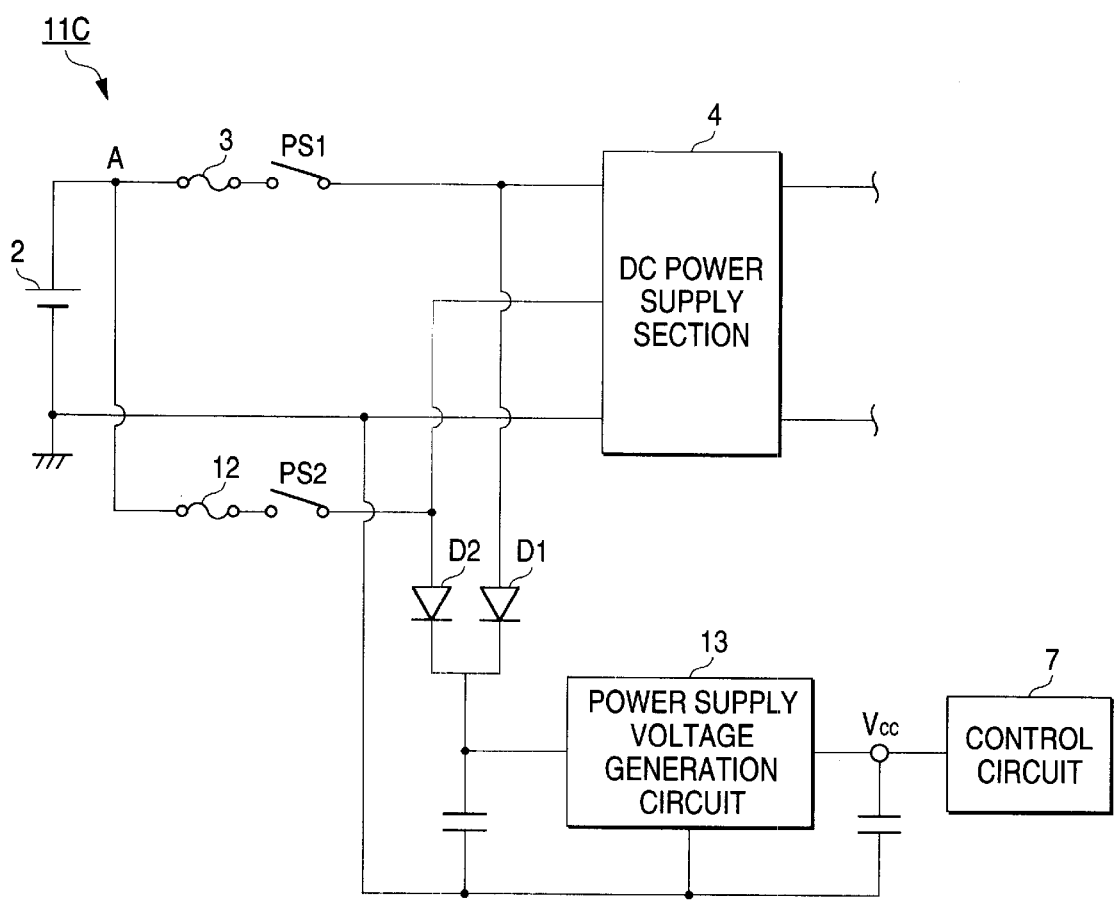
FIG. 8 is a circuit block diagram to show still another configuration example for power supply to the lighting circuit and the control circuit.

In addition, configuration examples shown in FIGS. 7 and 8 are possible.

In a configuration example 11B shown in FIG. 7, one of branch power supply voltages at the point A from the DC power supply 2 is supplied via the first overcurrent protection means 3 and a power input switch PS to the DC power supply section 4 and the power supply voltage generation circuit 13 and the other branch power supply voltage at the point A from the DC power supply 2 is supplied via the second overcurrent protection means 12 and a light switch LS to the control circuit 7.

When the power input switch PS is turned on, one discharge lamp is lighted and when the light switch LS is turned on, the other discharge lamp is lighted. For example, in a system using discharge lamps for a run beam (so-called high beam) and a dipped beam (low beam), the run beam can be lighted as the light switch LS is turned on, or in a system using discharge lamps as left and right lamps placed on the vehicle front, the switches PS and LS are synchronized with each other to define the on/off state. To light two discharge lamps using a common circuit, for example, positive-polarity and negative-polarity voltages output separately from output terminals of the DC power supply section 4 may be sent to the DC-AC conversion section 5. To switch the voltages, a bridge-type circuit using a plurality of switching elements may be provided in the DC-AC conversion section 5 and the switching elements may be alternately operated by a drive circuit for generating AC voltage and the generated AC voltage may be supplied to each discharge lamp. Starter circuits may be provided in a one-to-one correspondence with the discharge lamps and when the switch PS is turned on, one discharge lamp may be started and when the switch LS is turned on, the other discharge lamp may be started; as far as the invention is concerned, however, any circuit configuration may be adopted.

In the circuit, if the first overcurrent protection means 3 works and it is made impossible to supply power to the DC power supply section 4 of the lighting circuit, power is supplied to the control circuit 7 to ensure that the control circuit 7 operates as long as the power is supplied thereto from the second overcurrent protection means 12 via the light switch LS.

In a configuration example 11C shown in FIG. 8, one of branch power supply voltages at the point A from the DC power supply 2 is supplied via the first overcurrent protection means 3 and a power input switch PS1 to the DC power supply section 4 and is also supplied via a diode D1 to the power supply voltage generation circuit 13. The other branch power supply voltage at the point A from the DC power supply 2 is supplied via the second overcurrent protection means 12 and a power input switch PS2 to the DC power supply section 4 and is also supplied via a diode D2 to the power supply voltage generation circuit 13. That is, in the example, the two diodes D1 and D2 are connected to form an OR circuit and the power supply voltage through the OR circuit is supplied to the power supply voltage generation circuit 13. Predetermined voltage VCC output by the power supply voltage generation circuit 13 is supplied to the control circuit 7. To apply the circuit, for example, to a system using discharge lamps for a run beam (high beam) and a low beam or a system using discharge lamps as left and right lamps placed on the vehicle front, the lighting circuits may be provided in a one-to-one correspondence with the discharge lamps.

In the circuit, unless both the first and second overcurrent protection means work making it impossible to supply power, power is supplied not only to the DC power supply section 4, but also to the power supply voltage generation circuit 13 and by extension to the control circuit 7 to ensure that the control circuit 7 operates.

In the description made so far, two power supply routes exist; however, various modes providing three or more routes considering convenience, for example, may be adopted, needless to say.

Next, the function described above in (B) is the measure to be taken by the control circuit 7 to guarantee the safety of vehicle running if the overcurrent protection means 3 placed on the power supply route from the DC power supply 2 to the DC power supply section 4 works for shutting off power supply to the discharge lamp 8 in each above-described circuit, for example.

Specific measures are as follows:
  (i) A control signal is sent from the control circuit to the lighting circuit of an alternative light source for lighting the alternative light source as an alternative to the discharge lamp;
  (ii) a signal is sent from the control circuit to display means for notifying the driver that an anomaly of lighting the discharge lamp occurs;
  (iii) (i) and (ii) are used together.

First, as for (i), if it becomes impossible to light the discharge lamp, immediately another light source is lighted as an alternative light source to the discharge lamp, whereby sufficient lighting can be provided.

It is preferred from the viewpoint of running safety to add as many light sources as the necessary number of alternative light sources to the discharge lamps thereto. However, a problem is involved in the points of the costs, the apparatus installation space, etc. Then, for example, the mode of using a discharge lamp for a head lamp light source (run beam (high-beam) light source or low-beam light source) and using the light source of an auxiliary head lamp (fog lamp, clearance lamp, cornering lamp, etc.,) as an alternative light source, the mode in which if a discharge lamp is used for either of run beam (high-beam) and low-beam light sources forming the head lamp light sources, the other light source is used as an alternative light source, or the like is possible.

As for (ii), display means, such as an indicator, is used to notify the driver that it is made impossible to light the discharge lamp, so that the driver can be warned. That is, if it is made impossible to light the discharge lamp, the vehicle's driver should be notified of occurrence of anomaly so as to prompt the driver to replace the discharge lamp, repair the lighting circuit, etc.

Figure 9:
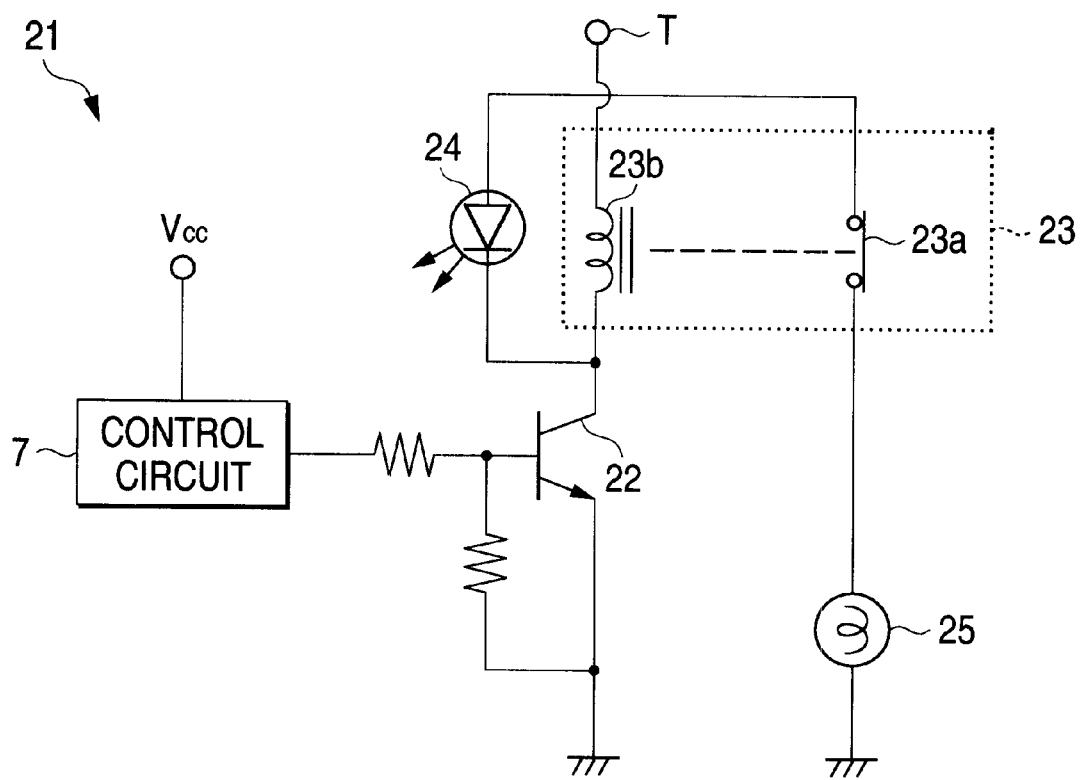
FIG. 9 is a circuit block diagram to show a circuit configuration example to light an alternative light source and notifying an anomaly.

FIG. 9 shows a circuit configuration example 21 to light an alternative light source when it is made impossible to light the discharge lamp.

If the control circuit 7 detects a state in which the discharge lamp 8 cannot be lighted, an npn transistor 22 is turned on by an output signal of the control circuit 7. A coil 23b of a relay 23 for lighting an alternative light source 25 and a light emitting element 24, such as a light emitting diode or an electric bulb, are connected to a collector of the npn transistor 22. Since they are connected in parallel and a predetermined voltage (voltage on a separate route from the supply voltage route to the DC power supply section 4; for example, input voltage to the power supply voltage generation circuit 13 or the like in FIG. 2) is supplied from a power supply terminal T, as the transistor 22 is turned on, the relay 23 is actuated and a contact 23a of the relay 23 is closed, whereby the alternative light source 25 is lighted and at the same time, the light emitting element 24 emits light. Since the light emitting element 24 provides an indicator for notifying the driver of a lamp anomaly, when the driver becomes aware of it, immediately he or she can recognize that the alternative light source 25 is lighted because of occurrence of anomaly.

To detect a state in which the discharge lamp 8 cannot be lighted, hitherto, various methods, such as a detection method of monitoring the voltage value and the current value involved in the discharge lamp and determining whether or not they are within the tolerances, a detection method of detecting the circuit operation stopping, and a detection method of comparing the DC input voltage with a threshold value to determine whether or not it is within the tolerance, have been known and any detection method maybe adopted in the invention and therefore the detection method will not be discussed in detail.

In the configuration shown in FIG. 9, the relay coil and the light emitting element are driven by one transistor, but separate drive transistors may be provided in a one-to-one correspondence with the coil and the element and various modes of using a circuit for blinking the light emitting element, an audible alarm producing circuit, etc., in combination are also possible.

As for (iii), namely, using (i) and (ii) together, if the alternative light source is lighted immediately when it becomes impossible to light the discharge lamp, it is feared that the driver may be hard to become aware of occurrence of the anomaly, and if the driver fails to take steps of repair, replacement, etc., for example, the following inconveniences are feared:

If it becomes impossible to light the alternative light source, then none of lighting means become available, thus resulting in requiring the driver to run the vehicle in the dark in the nighttime; this is dangerous.

If the state in which the driver is not aware of the anomaly continues over a long time period, an increase in load on the power supply caused by fruitless power consumption and the danger of an electric shock introduce problems.

Then, it becomes more effective to notify the driver that the anomaly occurs as in (ii) if (i) is adopted.

By the way, if an anomaly is recognized in the operation state of the control circuit itself comprising the above-described functions (A) and (B), it is obvious that the measure shown in (A) or (B) is not guaranteed. Then, in the invention, an internal state monitoring circuit 26 is provided for monitoring the operation state of the control circuit itself (see FIG. 1). When the internal state monitoring circuit 26 detects an anomaly in the control circuit 7 or detects a sign of occurrence of an anomaly (significant voltage or signal change, etc.,), the alternative light source is lighted or the driver is notified of occurrence of anomaly.

Figure 10:
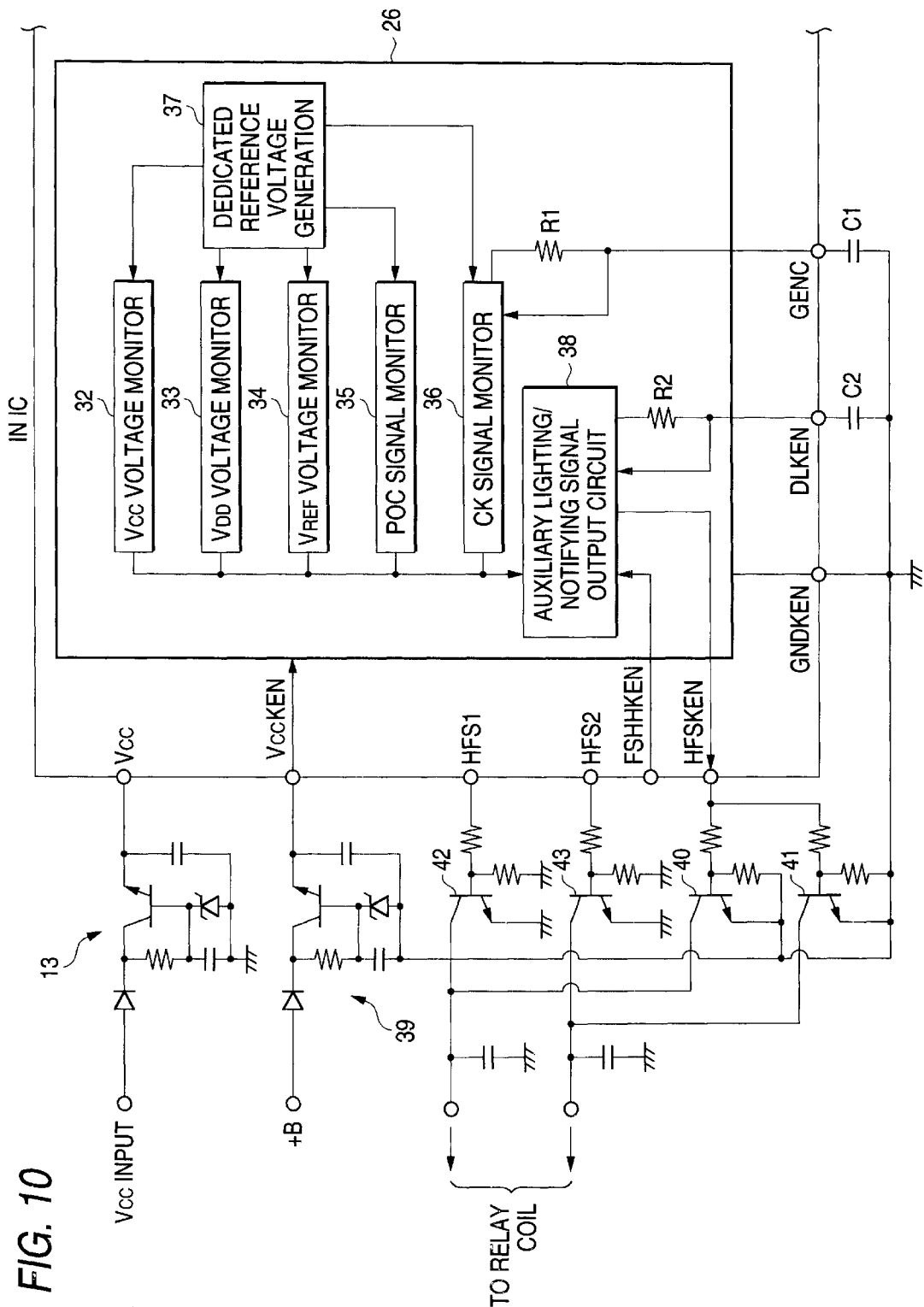
FIG. 10 is a circuit block diagram to show a configuration example of an internal state monitoring circuit.

FIG. 10 shows a configuration example of the internal state monitoring circuit 26 (a diagnosis circuit of the control circuit 7). The result of analyzing the items to be monitored by the internal state monitoring circuit 26 is as follows:

Power supply voltage to the control circuit, VCC (power supply voltage for analog circuit) and VDD (power supply voltage for digital circuit)

Reference voltage VREF

Reset signal POC (pulse on clear)

Reference clock signal CK

That is, if an anomaly occurs in any of them, it turns out that the probability that the central function of the control circuit 7 will be paralyzed is high. If an anomaly occurs in the power supply voltage VCC or VDD (output open state, short-circuit failure, etc., of the lighting circuit) and the voltage value falls almost to zero, the circuits for discharge lamp power control and anomaly detection become dysfunctional and neither the function (A) nor the function (B) described above is accomplished.

Figure 11:
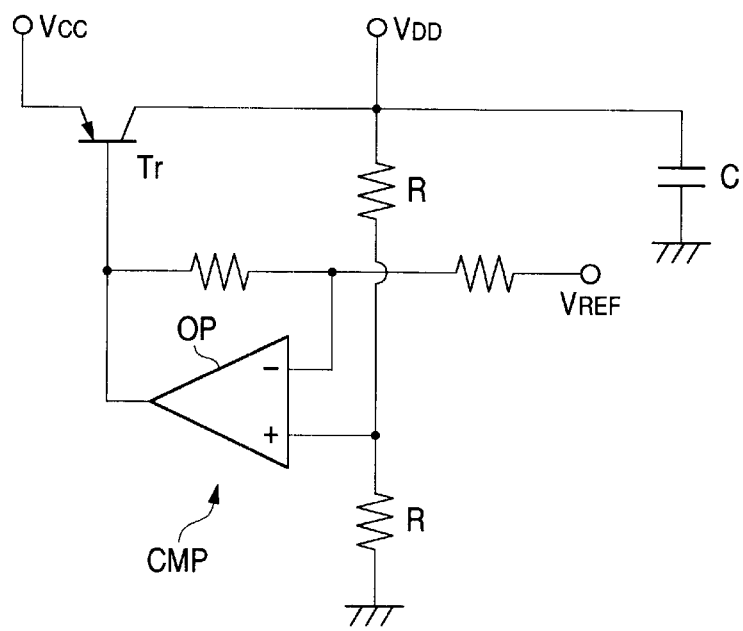
FIG. 11 is a circuit block diagram to show a configuration example of a VDD generation circuit.

Various modes of a VDD generation circuit are possible: For example, as shown in FIG. 4, the VDD generation circuit is implemented as a series regulator comprising input voltage as VCC and output voltage as VDD or as shown in FIG. 11, a pnp transistor Tr and an operational amplifier OP are used and the comparison result between partial voltage value of the output voltage VDD (detection value) and the reference voltage VREF is provided by a comparator CMP and is fed back into the base of the transistor Tr, thereby controlling voltage. The cause of making it impossible to normally output the voltage value of VDD can be a failure of a circuit component, a heavy load, a terminal connection fault, etc.

If the setup value of the reference voltage VREF shifts largely from a planned value, it is made impossible to foresee the control and circuit protection operation and thus there is a fear of incurring an unexpected accident.

Figure 12:
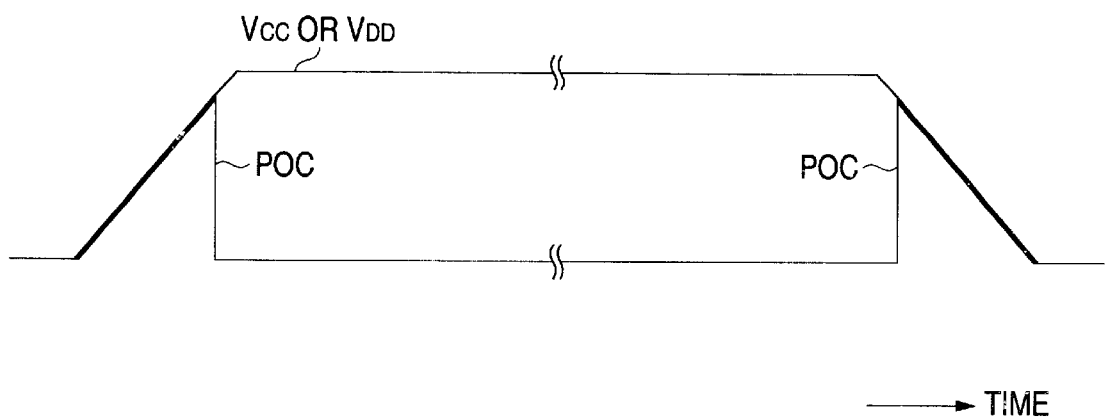
FIG. 12 is a schematic representation of a reset signal.

Various configurations of a VREF generation circuit, such as a circuit to generate reference voltage in a general IC (band gap reference voltage source), are known and special items to be described do not exist and therefore the circuit configuration, etc., will not be discussed in detail The reset signal POC is a signal intended for initializing circuitry and postprocessing. For example, to initialize a flip-flop, a counter, etc., forming a logic circuit, the reset signal is supplied to a set terminal or a preset terminal of IC, whereby the purpose can be easily accomplished. The reset signal can be generated in an already known circuit configuration as a signal which becomes like a pulse on the rising edge or the falling edge of the voltage VCC or VDD accompanying the operation of turning on/off a power switch, etc., and is set low in a state in which the voltage VCC or VDD indicates zero or stable voltage as a waveform shown in FIG. 12, for example. If an anomaly occurs in the reset signal POC and the signal stays high (this state cannot occur in the normal operation), resetting an unexpected circuit, etc., occurs and thus it is feared that the anomaly detection and circuit protection functions may not work.

Figure 13:
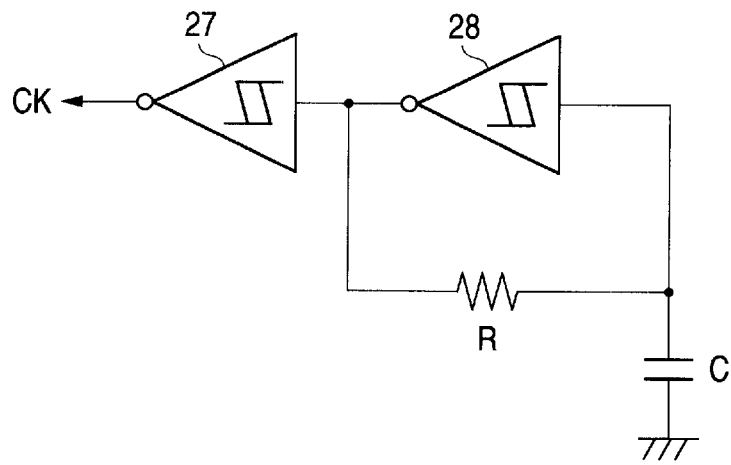
FIG. 13 is a circuit block diagram to show a configuration example of a reference clock signal generation circuit.
Figure 14:
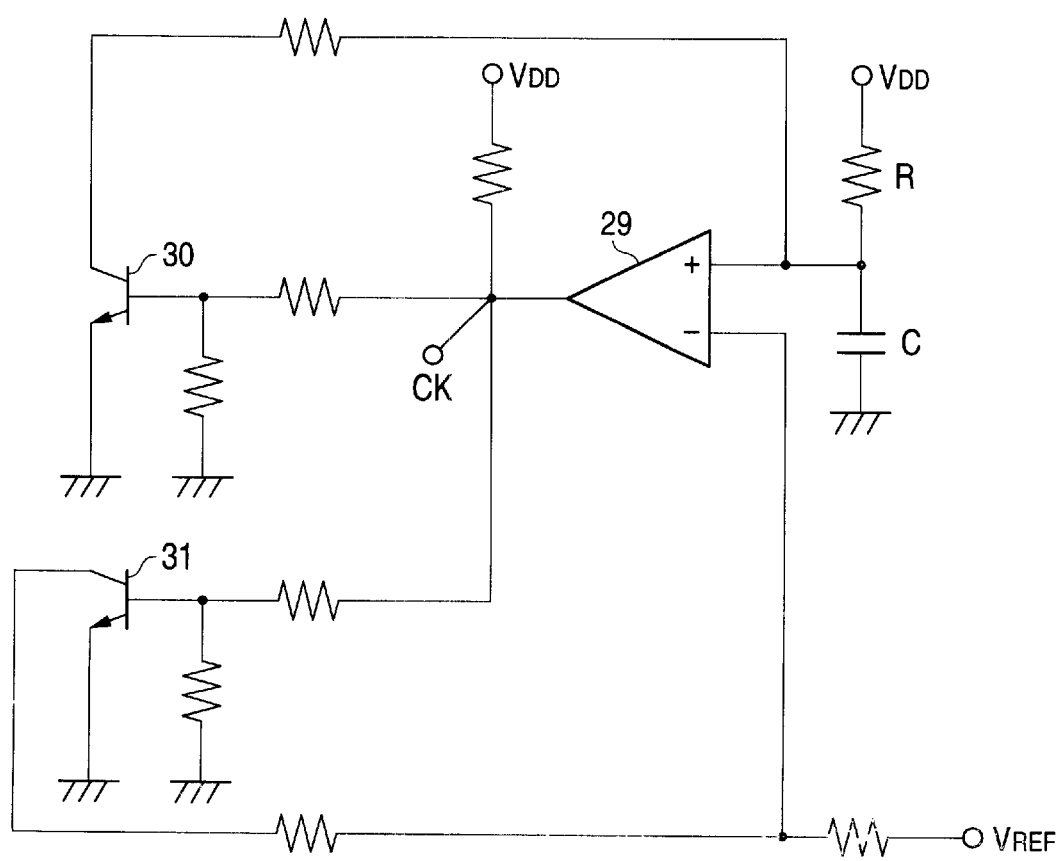
FIG. 14 is a circuit block diagram to show another configuration example of a reference clock signal generation circuit.

The reference clock signal CK can be a reference signal on which a control signal supplied for bridge drive if a bridge-type configuration is used as the DC-AC conversion section 5, for example, is based. Concerning the signal, if the reference signal as the normal frequency is not oscillated, disadvantages that the circuit operation is not guaranteed and that the bridge operation stops (necessary electric power is not output) occur. If it becomes impossible to provide a signal of a normal frequency as a clock signal, etc., supplied to the counter, a timer circuit, etc., forming a digital logic circuit, it is feared that erroneous detection or determination may be made. Various configurations of a generation circuit of the reference clock signal CK are possible. For example, if accuracy is not required, a configuration example of using Schmitt trigger inverters 27 and 28 and passive elements (resistor R and capacitor C) as shown in FIG. 13 is possible. If accuracy is required, a configuration example of using a CR circuit (resistor R and capacitor C), a comparator 29, and npn transistors 30 and 31 with emitters grounded to repeat charging and discharging the capacitor C, for example, as shown in FIG. 14 is possible. In FIG. 14, voltage VDD is supplied to the capacitor C via the resistor R and the terminal voltage of the capacitor C is supplied to a positive input terminal of the comparator 29 and when the comparator 29 outputs high, the transistor 30 is turned on, forming the discharge path of the capacitor C and the transistor 31 is turned on, supplying resistance partial potential value of the reference voltage VREF to a negative input terminal of the comparator 29 (when the comparator 29 outputs low, the reference voltage VREF is supplied to the negative input terminal of the comparator 29).

The internal state monitoring circuit 26 always monitors the presence or absence of an anomaly about supply voltage (power supply voltage or reference voltage used in the control circuit 7) and supply signals (reset signal and reference clock signal) to the control circuit 7 for controlling power supply to the discharge lamp 8 and detecting an anomaly. If occurrence of an anomaly is detected, the internal state monitoring circuit 26 lights the alternative light source or notifies the driver of occurrence of the anomaly.

The components shown in FIG. 10 are as follows (the numeral enclosed in parentheses indicates the reference numeral):

VCC voltage monitor circuit (32);
VDD voltage monitor circuit (33);
VREF voltage monitor circuit (34);
POC signal monitor circuit (35);
CK signal monitor circuit (36);
dedicated reference voltage generation circuit (37); and
auxiliary lighting/notifying signal output circuit (38).

The circuits are placed in the IC implementing the control circuit 7 and terminals shown in the figure have the following meanings:

VCCKEN: Dedicated power supply input terminal to internal state monitoring circuit 26;
HFSKEN: Output terminal for outputting monitor result;
FSHHKEN: Set input terminal for determining output phase of terminal HFSKEN
GNDKEN: Dedicated ground terminal to internal state monitoring circuit 26;
DLKEN: Capacitor connection terminal for generating delay time for output signal of monitor result
GENC: Integral capacitor connection terminal of reference clock signal; and
HFS1, HFS2: Output terminal for outputting instruction signal to lighting circuit of alternative light source.

As shown in the figure, the IC comprises not only the terminal to which the power supply voltage VCC from the power supply voltage generation circuit 13 is supplied, but also the supply terminal VCCKEN of a power supply voltage generated by a constant-voltage circuit 39 from power supply voltage of the DC power supply 2 (+B), and power is supplied through the terminal VCCKEN to the internal state monitoring circuit 26. That is, in the example, the power supply voltage generation circuit 13 and the constant-voltage circuit 39 both adopt the same series regulator configuration and the values of voltages generated by the circuits are the same. One power supply voltage is used with other circuits in the IC and the supply voltage to the terminal VCCKEN is dedicated power supply voltage to the internal state monitoring circuit 26; both the voltages are independent of each other.

The VCC voltage monitor circuit 32 and the VDD voltage monitor circuit 33 comprise each a comparator for voltage comparison; the value of VCC or VDD is compared with a predetermined reference voltage from the dedicated reference voltage generation circuit 37 and the comparison result (indicating whether or not the power supply voltage is within tolerance) is sent to the auxiliary lighting/notifying signal output circuit 38. The dedicated reference voltage generation circuit 37 generates the predetermined reference voltage based on the power supply voltage from the terminal VCCKEN. The reference voltage is used only in the internal state monitoring circuit 26.

The VREF voltage monitor circuit 34 is provided for monitoring the level of the reference voltage VREF used in parts of the ICs and comprises a comparator for voltage comparison. That is, the level value of VREF is compared with the reference voltage from the dedicated reference voltage generation circuit 37 and the comparison result (indicating whether or not the reference voltage is within tolerance) is sent to the auxiliary lighting/notifying signal output circuit 38.

The POC signal monitor circuit 35 is provided for monitoring the reset signal. The reset signal is sent through a filter circuit, such as a CR filter, to an internal comparator, which then compares the reset signal with the reference voltage from the dedicated reference voltage generation circuit 37. The reset signal indicates a transient voltage on the rising edge or the falling edge of VCC or VDD and otherwise indicates zero volts as a normal value, as described above. Therefore, if the level of the POC signal exceeds the reference voltage (threshold value) of the dedicated reference voltage generation circuit 37, an anomaly is determined to occur, and the determination result (the comparison result of the comparator) is sent to the auxiliary lighting/notifying signal output circuit 38.

The CK signal monitor circuit 36 is provided for monitoring the reference clock signal CK and comprises a comparator for comparing the integral of the signal CK passed through an integration circuit (CR circuit) made up of the capacitor C1 connected to the terminal GENC and a resistor R1 in the IC with the reference voltage from the dedicated reference voltage generation circuit 37.

That is, the signal CK usually is generated by the oscillation operation of a signal generation circuit (not shown) with duty cycle 50% and thus the integral provided by passing the signal CK through the CR circuit becomes a constant value or is within tolerance. However, when an anomaly occurs, the integral largely changes and goes out of the tolerance and thus a comparator is provided for detecting it. An output signal of the comparator is sent to the auxiliary lighting/notifying signal output circuit 38. If the frequency of the signal CK shifts a little from a stipulated value, the discharge lamp is lighted without a hitch. However, if the frequency becomes too low and ripple becomes large, an anomaly is determined to occur.

The auxiliary lighting/notifying signal output circuit 38 performs logical operation on the output signals from the above-described monitor circuits 32 to 36 and outputs the logical operation result to the terminal HFSKEN. For example, if the auxiliary lighting/notifying signal output circuit 38 ORs the output signals from the monitor circuits and outputs the result, when an anomaly occurs in any of VCC, VDD, VREF, POC, or CK, an anomaly detection signal is output to the terminal HFSKEN. Of course, it is also possible to AND a plurality of abnormal states of the voltages and signals and provide an anomaly detection signal depending on the result, for example, to output an anomaly detection signal if the three voltages of VCC, VDD, and VREF become abnormal. However, the method of outputting an anomaly detection signal if an anomaly is detected even in one of the voltages and signals is preferred from the viewpoints of simplifying the circuit configuration and safety measure.

In the circuit, an output phase can be selected depending onto the setup voltage on the terminal FSHHKEN (a logical value fitted to decreasing the number of the circuit components can be selected); in the example, however, positive logic is adopted (high signal indicates occurrence of an anomaly and low signal indicates the normal state) for easy understanding.

A capacitor C2 connected to the terminal DLKEN and a resistor R2 in the IC make up a delay circuit (time constant circuit) and a delay time for an output signal can be set. An output signal of the terminal HFSKEN is supplied to bases of two npn transistors 40 and 41 (with emitters grounded) placed outside the IC.

The example assumes two discharge lamps; alternative light sources, such as incandescent lamps, are provided in a one-to-one correspondence with the discharge lamps and lighting the first alternative light source is controlled by an output signal of the terminal HFS1 and lighting the second alternative light source is controlled by an output signal of the terminal HFS2.

That is, an npn transistor 42 with an emitter grounded is provided for the terminal HFS1 and the terminal HFS1 is connected to a base of the transistor 42 via a resistor so that the alternative light source is lighted when the transistor 42 is turned on. A collector of the transistor 42 is connected to a relay coil (not shown), supply of the voltage +B is received, and power is supplied from the voltage +B via relay contact to the alternative light source (see FIG. 9).

Likewise, an npn transistor 43 with an emitter grounded is provided for the terminal HFS2 and the terminal HFS2 is connected to a base of the transistor 43 via a resistor so that the alternative light source is lighted when the transistor 43 is turned on. A collector of the transistor 43 is connected to a relay coil (not shown), supply of the voltage +B is received, and power is supplied from the voltage +B via relay contact to the alternative light source (see FIG. 9).

Therefore, the transistors 42 and 43 correspond each to the transistor 22 shown in FIG. 9.

The two npn transistors 40 and 41 for the terminal HFSKEN have bases connected to the terminal via resistors, the transistor 40 has a collector connected to the collector of the transistor 42, and the transistor 41 has a collector connected to the collector of the transistor 43. Therefore, when an output signal of the terminal HFSKEN is high, the transistors 40 and 41 are turned on, driving the relays. Consequently, both the alternative light sources are lighted.

In the circuit, the power supply terminals and ground terminal for the internal state monitoring circuit 26 are provided separately from the terminals in other circuits making up the control circuit 7, whereby independency is kept (as shown in FIG. 10, power supply input is received from the terminal VCCKEN and for ground, the terminal GNDKEN is connected to the constant-voltage circuit 39, the emitters of the transistors 40 and 41, and the capacitors C1 and C2), so that the circuit is hard to be affected by various factors.

Signals from the circuits in the IC for making anomaly detection and determination are supplied to the terminals HFS1 and HFS2. To detect occurrence of an anomaly for the discharge lamp or the lighting circuit, preferably a time measuring circuit for measuring the elapsed time from the point in time of detecting the anomaly occurrence is provided and an anomaly is not determined to occur until a predetermined time (determination time, the duration of which indicates a threshold value) has elapsed to ensure that the determination result is reliable.

Figure 15:
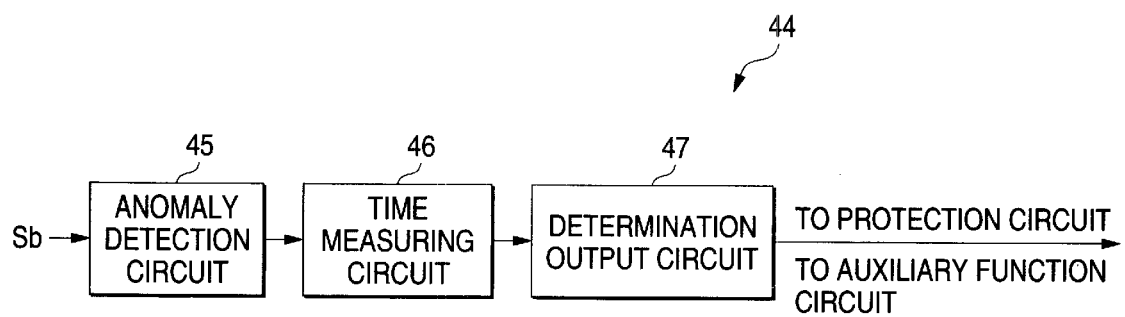
FIG. 15 is a block diagram to show the basic configuration of an anomaly detection and determination circuit.

Hitherto, various configurations, detection methods, and determination methods of an anomaly detection and determination circuit have been known and it is impossible to describe all of them and therefore the basic point will be discussed briefly below:

FIG. 15 shows a configuration example of an anomaly detection and determination circuit 44, and the a nomaly detection and determination circuit 44 comprises the following components (the numeral enclosed in parentheses indicates the reference numeral):

Anomaly detection circuit (45);

time measuring circuit (46); and determination output circuit (47).

For example, an anomaly is caused by detachment of a discharge lamp (output open state of the lighting circuit), a short circuit of electrode, abnormal input voltage of the lighting circuit (overcurrent or voltage lowering), or any other factor; in any way, detection of an anomaly requires a source signal or a primary signal (Sb) on which the anomaly detection is based, and the signal Sb is sent to the anomaly detection circuit 45.

Based on the signal Sb, the anomaly detection circuit 45 outputs a detection signal indicating that the probability that some anomaly occurs is high to the time measuring circuit 46 at the following stage. That is, at the point in time, it is too early to determine that an anomaly occurs, and thus the time measuring circuit 46 determines whether or not the state continues over a given time or more.

The time measuring circuit 46 is implemented using a timer, a counter, etc. Upon reception of the output signal from the anomaly detection circuit 45, the time measuring circuit 46 starts the time measuring operation. If the abnormal state continues for the given time, the time measuring circuit 46 sends a signal indicating the determination result meaning occurrence of an anomaly to the determination output circuit 47.

Upon reception of the signal, the determination output circuit 47 sends a control signal indicating the presence or absence of anomaly occurrence and the instruction contents responsive thereto to protection circuits (including a fail safe circuit, etc.,) and auxiliary function circuits (including the lighting circuit of the alternative light source, the notification circuit, etc.,).

Figure 16:
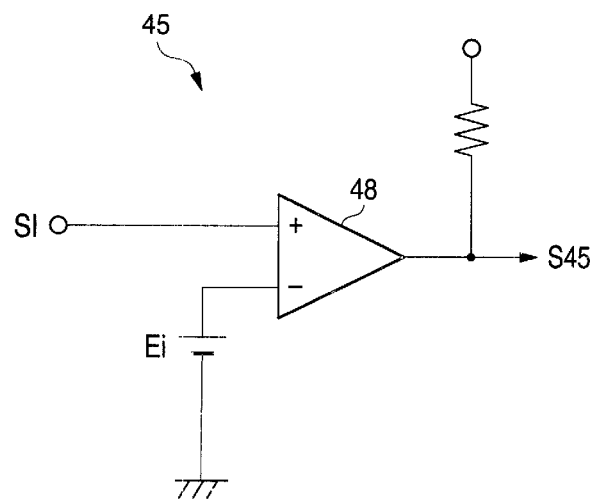
FIG. 16 is a circuit block diagram to show a configuration example of an anomaly detection circuit.

FIG. 16 shows a configuration example of the anomaly detection circuit 45.

Usually, to detect an anomaly, detection circuits are provided in a one-to-one correspondence with the target detection items and it is too onerous to describe all and therefore in the description to follow, anomaly detection related to an output open state is taken as an example.

As shown in the figure, in the anomaly detection circuit 45, a current detection signal SI of the discharge lamp 8 is supplied to a positive input terminal of a comparator 48 and a reference voltage Ei (indicated by a symbol of constant-voltage power supply in the figure) is supplied to a negative input terminal of the comparator 48. That is, in an open state, no current flows into the discharge lamp 8 and thus the current detection signal SI (provided by converting detection current into voltage) has a smaller level than the reference voltage Ei and therefore the comparator 48 outputs a low signal.

Any other anomaly is also detected by comparing the detection signal level with a predetermined threshold value as in the example; to detect repetitive change concerning voltage and current, it becomes necessary to use a plurality of comparators in combination to make up a detection circuit, etc.

Figure 17:
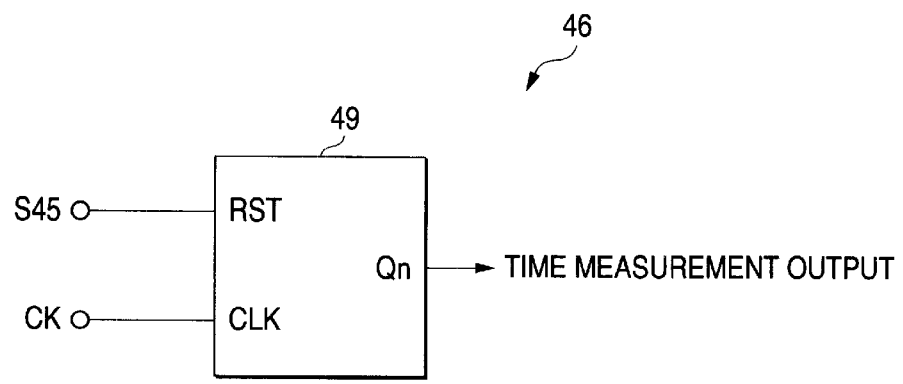
FIG. 17 is a circuit block diagram to show a configuration example of a time measuring circuit.

FIG. 17 shows a configuration example of the time measuring circuit 46.

As the time measuring circuit 46, a configuration of using a time constant circuit (CR circuit), etc., as an analog timer can also be used, but a counter 49 is used in the example.

In the counter 49, a signal S45 from the anomaly detection circuit 45 is supplied to a reset terminal RST and a clock signal CK from clock signal generation circuit (not shown) is supplied to a clock signal input terminal CLK.

A signal indicating the anomaly determination result is output from an output terminal Qn at the n'th stage of the counter 49 when the signal S45 is low and the clock signal is counted as many times as the predetermined number of times. That is, it is assumed that when the signal S45 is low, it indicates an abnormal state, and therefore if this state continues long, a high signal is output from the output terminal Qn of the counter 49.

Figure 18:
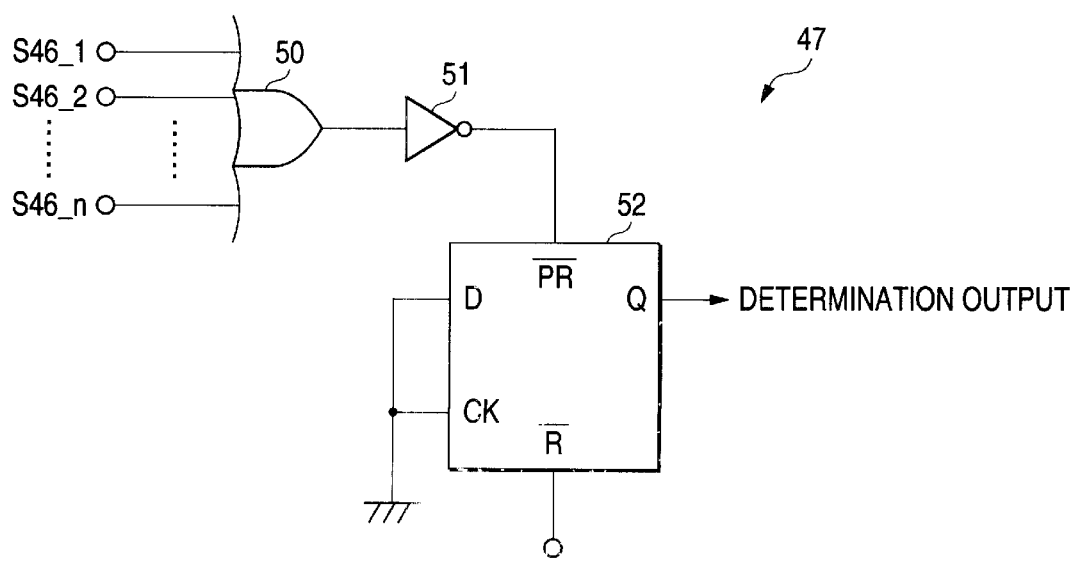
FIG. 18 is a circuit block diagram to show a configuration example of a determination output circuit.

FIG. 18 shows a configuration example of the determination output circuit 47. In the example, a configuration wherein the determination results provided by a plurality of time measuring circuits are ORed by an OR circuit and the result is supplied to a latch circuit is used.

Signals S46_i (i=1, 2, . . . ) are signals indicating the determination results of the time measuring circuits provided for determining various anomalies and are input to a multiple-input, one-output OR gate 50 and an output signal of the OR gate 50 is supplied through a NOT gate 51 to a preset terminal (to indicate that the terminal is active low, PR is overscored in the figure as "$\overline{PR}$") of a D flip-flop 52. A D input terminal and a clock signal input terminal CK of the D flip-flop 52 are set low and an active-low reset terminal (R is overscored in the figure as "$\overline{R}$") is set high.

Therefore, when any of the signals S46_i (i=1, 2, . . . ) goes high, the OR gate 50 outputs high and this high signal is inverted by the NOT gate 51, then the result is sent to the preset terminal of the D flip-flop 52. Consequently, a high signal is provided on a Q output terminal of the D flip-flop 52. This high signal is maintained and thus if the signal S46_i later goes low indicating a normal state, the Q output terminal remains high. The signal output is sent to protection circuit (not shown; having a configuration of opening the relay contact placed on the power supply route to the DC power supply section, for example, if occurrence of an anomaly is detected) for stopping the operation of the DC power supply section and the DC-AC conversion section or is sent to the transistor 22 shown in FIG. 9 to light the alternative light source.

As seen from the description given above, according to the first aspect of the invention, the internal state monitoring circuit monitors the operation state of the control circuit, whereby the alternative light source can be reliably lighted or the driver can be reliably notified of anomaly occurrence before the control circuit shows abnormal operation. Thus, sufficient safety measure can be taken.

According to the second aspect of the invention, the presence or absence of an anomaly is monitored about supply voltage and a supply signal to the control circuit, whereby before the control circuit shows abnormal operation, its sign can be caught.

According to the third aspect of the invention, an anomaly about the power supply voltage to the control circuit or the reference voltage is detected, whereby it is made possible to light the alternative light source or notify the driver of occurrence of the anomaly before an operation anomaly caused by voltage change occurs.

According to the fourth aspect of the invention, an anomaly about the reference clock signal or the reset signal used in the control circuit is detected, whereby it is made possible to light the alternative light source or notify the driver of occurrence of the anomaly before an operation anomaly caused by frequency or level change of the signal occurs.

According to the fifth aspect of the invention, the power supply terminal or the ground terminal for the internal state monitoring circuit is provided separately from the power supply terminal or the ground terminal for the control circuit, whereby an anomaly can be detected and determined without being affected by any other circuit section.

What is claimed is:

1. A discharge lamp lighting circuit comprising:
   a control circuit for detecting an anomaly occurring in a discharge lamp or the lighting circuit, stopping power supply to the discharge lamp or stopping operation of the lighting circuit, and lighting another light source as an alternative light source to the discharge lamp or notifying a driver of occurrence of the anomaly; and
   an internal state monitoring circuit for monitoring an operation state of the control circuit itself,
   wherein, when the internal state monitoring circuit detects an anomaly in the control circuit or detects a sign of occurrence of an anomaly, the alternative light source is lighted or the driver is notified of anomaly occurrence.

2. The discharge lamp lighting circuit as claimed in claim 1, wherein the internal state monitoring circuit monitors the presence or absence of an anomaly about supply voltage and a supply signal to the control circuit for controlling power supply to the discharge lamp and detecting an anomaly.

3. The discharge lamp lighting circuit as claimed in claim 1, wherein if the internal state monitoring circuit detects an anomaly about power supply voltage to the control circuit or a reference voltage used in the control circuit, the alternative light source is lighted or the driver is notified of occurrence of the anomaly.

4. The discharge lamp lighting circuit as claimed in claim 1, wherein if the internal state monitoring circuit detects an anomaly about a reference clock signal or a reset signal used by the control circuit, the alternative light source is lighted or the driver is notified of occurrence of the anomaly.

5. The discharge lamp lighting circuit as claimed in claim 1, wherein a power supply terminal or a ground terminal for the internal state monitoring circuit is provided separately from a power supply terminal or a ground terminal in the control circuit.

6. The discharge lamp lighting circuit as claimed in claim 1, wherein said alternative light source is an auxiliary head lamp which is one of fog lamp, clearance lamp, cornering lamp.

7. The discharge lamp lighting circuit as claimed in claim 1, wherein said discharge lamp is one of a high-beam and low-beam light sources while said alternative light source is the other light source.

* * * * *